(12) United States Patent
Li et al.

(10) Patent No.: US 12,695,927 B2
(45) Date of Patent: Jul. 28, 2026

(54) CONTENT ADAPTIVE VIDEO LADDER OPTIMIZATION

(71) Applicant: Lemon Inc., Grand Caymon (KY)

(72) Inventors: Zhuqi Li, Culver City, CA (US); He Liu, Culver City, CA (US); Shenglan Huang, Culver City, CA (US); Himanshu Shrivastav, Culver City, CA (US); Yiting Liao, Culver City, CA (US); Qian Chen, Culver City, CA (US); Mingkui Liu, Culver City, CA (US)

( * ) Notice: Subject to any disclaimer, the term of this patent is extended or adjusted under 35 U.S.C. 154(b) by 169 days.

(21) Appl. No.: 18/610,144

(22) Filed: Mar. 19, 2024

(65) Prior Publication Data

US 2025/0301189 A1     Sep. 25, 2025

(51) Int. Cl.
*H04N 21/2343* (2011.01)
*H04N 21/231* (2011.01)

(52) U.S. Cl.
CPC ... *H04N 21/234309* (2013.01); *H04N 21/231* (2013.01)

(58) Field of Classification Search
None
See application file for complete search history.

(56) References Cited

U.S. PATENT DOCUMENTS

2015/0082345 A1* 3/2015 Archer ............... H04N 21/2668
                                                   725/34
2022/0030230 A1  1/2022 Chadwick et al.
2022/0159268 A1* 5/2022 Liu ................. H04N 21/23418

FOREIGN PATENT DOCUMENTS

WO        2012013711 A2     2/2012

OTHER PUBLICATIONS

Cricri et al.;"Video Ladder Networks". Dec. 30, 2016. (Year: 2016).*
Chen M.C., et al., "Rate-distortion Optimal Motion Estimation Algorithm for Video Coding," IEEE International Conference on Acoustics, Speech, and Signal Processing Conference Proceedings, May 9, 1996, pp. 2096-2099.
International Search Report and Written Opinion for International Application No. PCT/SG2025/050155, mailed Apr. 21, 2025, 9 pages.

* cited by examiner

*Primary Examiner* — Junior O Mendoza
(74) *Attorney, Agent, or Firm* — Fish & Richardson P.C.

(57)     ABSTRACT

Methods, systems, and apparatus, including computer programs encoded on computer storage media, for video streaming. One of the methods includes obtaining a collection of one or more video files at a content delivery system; for each video file: determining a set of video ladders for the video file, each video ladder corresponding to a transcoding version of the video file having particular parameters, the set of video ladders determined based on a set of individual ladder values that substantially maximize a measure of utility for one or more users viewing a content the video, wherein the utility of the video is based at least in part on a complexity of the video content and historical network characteristics; for each ladder in the set of video ladders, transcoding the video file into a corresponding version; and storing each transcoded version of the video for delivery to user devices.

17 Claims, 7 Drawing Sheets

Figure 2:
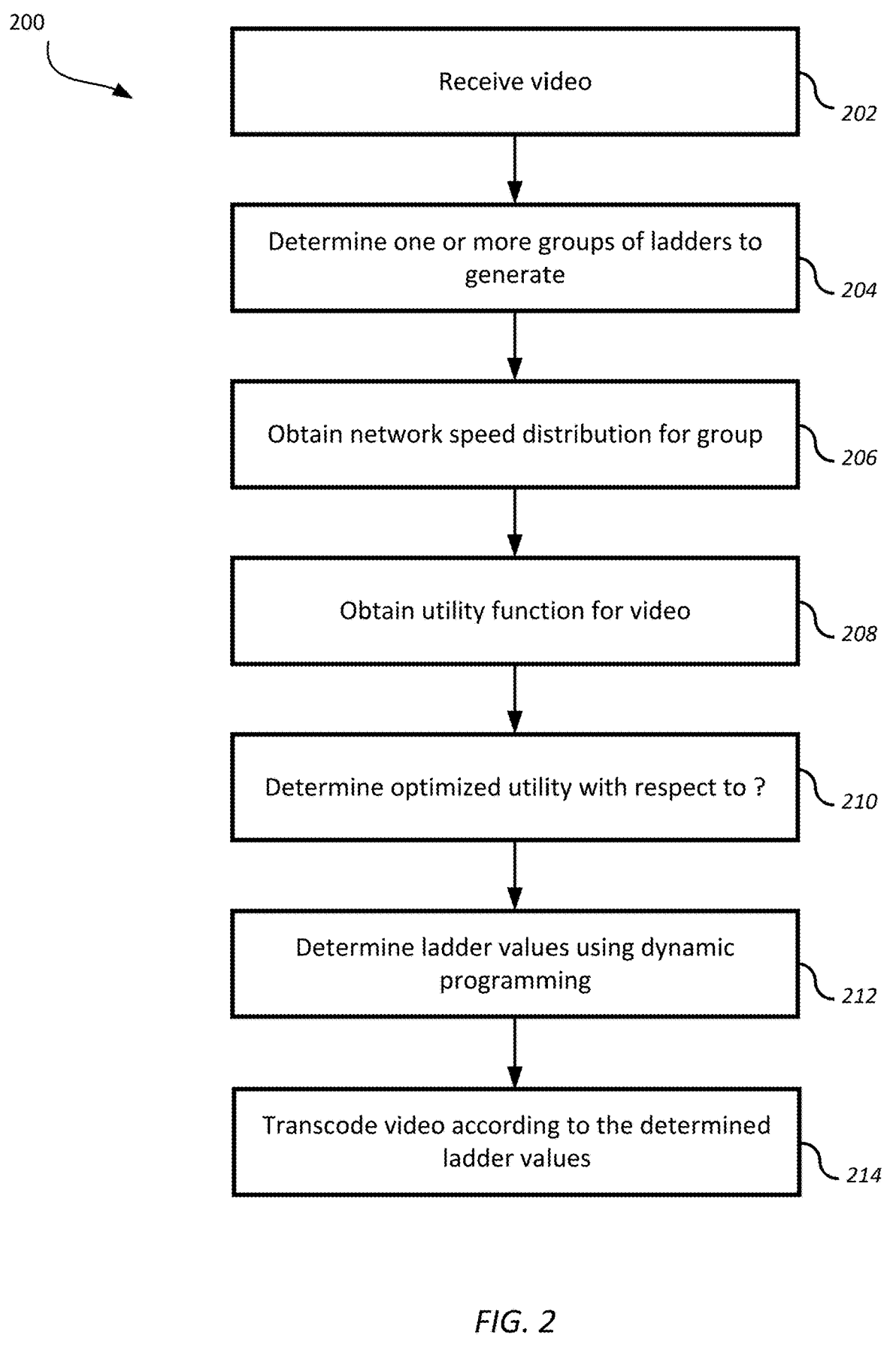

200

Receive video — 202

↓

Determine one or more groups of ladders to generate — 204

↓

Obtain network speed distribution for group — 206

↓

Obtain utility function for video — 208

↓

Determine optimized utility with respect to ? — 210

↓

Determine ladder values using dynamic programming — 212

↓

Transcode video according to the determined ladder values — 214

Receive request for video    602

Determine ladder    604

Provide corresponding version of video to user device for playback    606

CONTENT ADAPTIVE VIDEO LADDER OPTIMIZATION

BACKGROUND

This specification relates to video streaming.

Conventional video content providers will typically transcode video content into a number of different versions with different transcoding parameters. Using a set of different versions, which can also be referred to as video ladders, allows for particular versions to be selected for streaming to video to individual user devices based on, for example, different network conditions. Different versions of the video in the video ladder can correspond to different video resolutions, e.g., 1080p and 540p, and bitrates. Higher video resolutions typically require higher bandwidth network connections. Consequently, the selection of a particular video ladder can impact the end user's perceived video quality and playback performance depending on their network performance.

SUMMARY

This specification describes technologies for optimizing the video ladders for a given video. A video ladder refers to a set of video renditions or versions, each with different encoding parameters, e.g., bitrates and resolutions, that are created from a source video file. These technologies generally involve generating video ladders for a given video that takes into account the complexity of the video content and network conditions while balancing various playback characteristics of the video, for example, a video resolution, video stalling, or first frame delay. For example, changes in video resolution can result in blurring or pixelation of the video. Video stalling, for example due to rebuffering, can cause pauses or freezes during playback. First frame delay can be the result of a longer time needed to download video data to initiate playback. In particular, dynamic programming techniques can be used to identify video ladder parameters that optimize an expected utility of each video. The expected utility refers to a measure of user experience in watching the video at a particular bitrate. The expected utility for a video can be calculated based on a video quality score, e.g., based on a video multimethod assessment fusion (vmaf) metric, a rebuffering value, and a first frame delay value.

In general, one innovative aspect of the subject matter described in this specification can be embodied in methods that include the actions of obtaining a collection of one or more video files at a content delivery system; for each video file in the collection of video files: determining a set of video ladders for the video file, each video ladder corresponding to a transcoding version of the video file having particular parameters, the set of video ladders determined based on a set of individual ladder values that substantially maximize a measure of utility for one or more users viewing a content the video, wherein the utility of the video is based at least in part on a complexity of the video content and historical network characteristics; for each ladder in the set of video ladders, transcoding the video file into a corresponding version; and storing each transcoded version of the video for delivery to user devices.

Other embodiments of this aspect include corresponding computer systems, apparatus, and computer programs recorded on one or more computer storage devices, each configured to perform the actions of the methods.

This specification uses the term "configured" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

The subject matter described in this specification can be implemented in particular embodiments so as to realize one or more of the following advantages. Selecting video ladders for each video is based on an optimized utility that takes video complexity and user network conditions into account, which can improve user utility as compared with a simple set of static ladders that do not adapt to changing conditions or different levels of video complexity.

The use of dynamic programming can be used to improve existing content aware encoding algorithms. Using dynamic programming to find the set of ladders that optimize utility allows for rapid determination of video ladders for high volumes of videos with reduced computation as compared to other techniques. In particular, for content that is composed of very large quantities, e.g., millions or billions, of short-form videos of varied complexity, the optimized utility allows for rapid processing such that the ladder of each short-form video accounts for the complexity of that video.

Generating ladders based on video complexity further provides for more efficient use of network resources since less complex videos may allow for ladders having lower bitrates without compromising perceived playback quality.

Generating ladders for each video that accounts for the video complexity and network conditions for a group of user devices allows for an optimized video streaming quality that is tailored to the particular characteristics of the group of users. The system can select the most appropriate ladder when providing the video to a particular user based on the current network conditions and rebuffering possibilities that reduces a likelihood of video stalls and rebuffering events.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for optimizing a video ladder.

3

Like reference numbers and designations in the various drawings indicate like elements.

DETAILED DESCRIPTION

Video content can have different degrees of complexity. Complexity for a given video can depend on multiple factors including, for example, motion, color, texture, and scene changes within the video content. Different levels of complexity can mean that, at the same bitrate, a more complex video may have a lower perceptual quality than a lower complexity video. Additionally, when switching between videos, for example as part of a video feed on a social media application, the complexity may vary from video to video, e.g., as a user scrolls through their video feed.

When providing video content for one or more videos to an end user device, the network conditions may not be static. For example, the network speed and stability can vary between users based on, for example, geographical location, network infrastructure, and device capabilities. Moreover, the network conditions for the same user can also change because the user may be moving, e.g., walking, driving, etc. Thus, the network conditions when viewing one video may change when the user moves to the next video in the video feed.

There may also be a tradeoff between various playback characteristics of the video. For example, at a higher resolution the perceived quality, e.g., clarity or sharpness of the video content, may be greater, but depending on the network conditions the smoothness of playback, e.g., stalling or freezing instances during playback, may be worse since greater network resources may be required to provide the higher resolution video. Conversely, if uninterrupted playback is prioritized, the video may have a lower resolution.

The present specification describes techniques for a content adaptive video ladder optimization that increases the ability to provide high-quality, uninterrupted video streaming for users by taking into account network conditions and video complexity.

Figure 1:
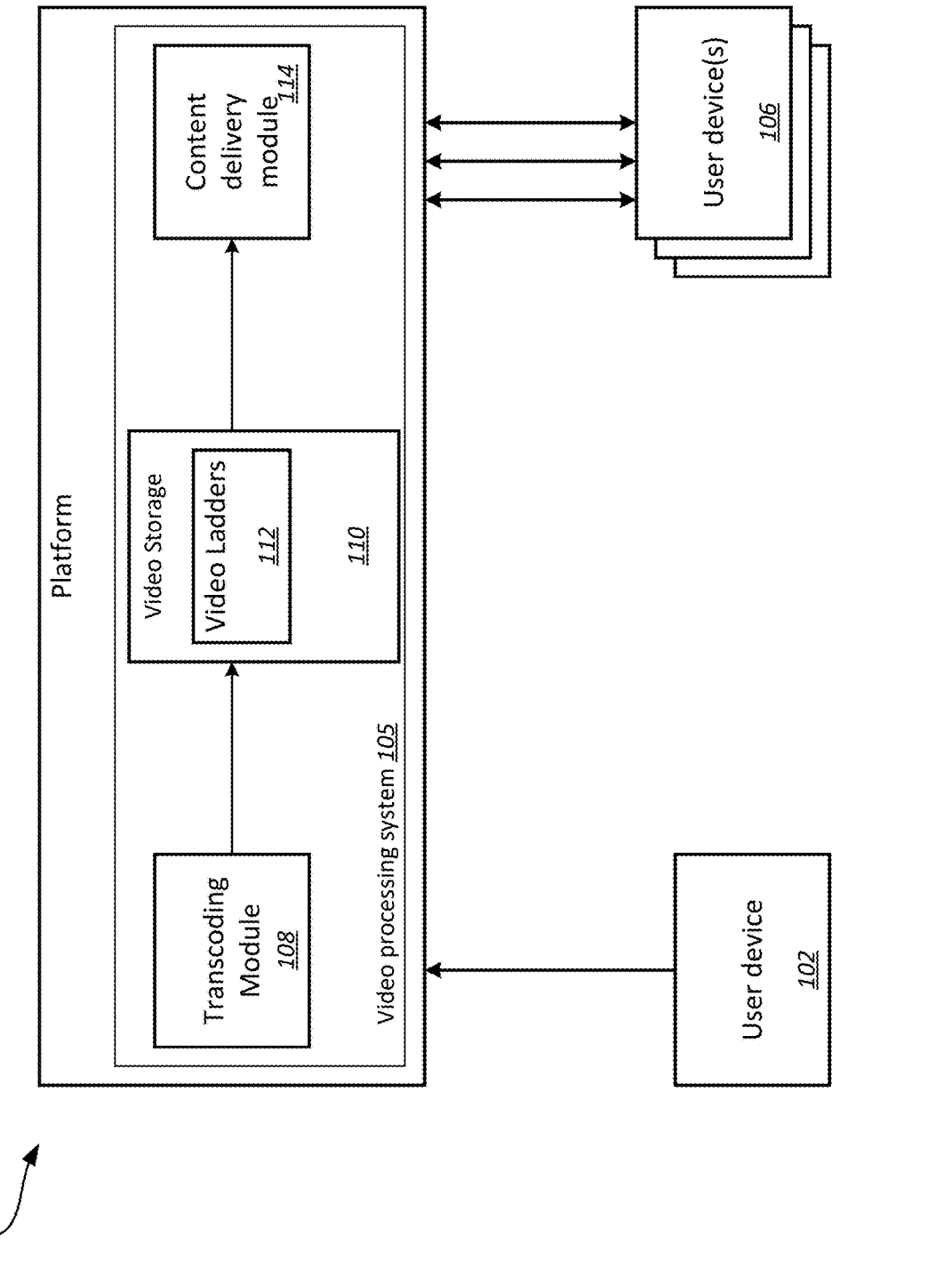
FIG. 1 is a block diagram of an example video processing pipeline.

FIG. 1 shows a block diagram of an example video processing pipeline 100. The video processing pipeline 100 illustrates an example video processing by a platform 104, e.g., a social media platform, for delivery.

A user device 102 can provide a video to the platform 104. Videos can be received by user devices 106. The user devices can be any Internet-connected computing device, e.g., a laptop or desktop computer, a smartphone, or an electronic tablet. The user device can be connected to the Internet through a mobile network, through an Internet service provider (ISP), or otherwise.

Each user device is configured with software, which will be referred to as a client or as client software, that in operation can access the platform 104 so that a user can interact with the platform 104. For example, the user can use the client software to upload video content to the platform 104 as well as receive videos from the platform 104. The client software can be a platform specific application installed on the user device.

In some implementations, the client software provides a user interface for interacting with the platform 104. The user interface can include receiving data from the platform 104 for presenting a feed of videos that the user can interact with. For example, the user can scroll up or down to switch between videos in the feed as well as interact with individual videos, e.g., by posting comments about the video, sharing the video, or expressing approval, e.g., liking the video.

In some implementations, the video content provided by the platform to user devices are short form videos. Short form videos are videos that are typically less than 90 seconds in length. In some implementations, short form videos have lengths of between 15 and 90 seconds. By contrast, long-form videos typically have lengths of at least 3 minutes.

In the example video processing pipeline 100, the user device 102 obtains or creates a video. For example, the user device 102 can be a mobile device that generates the video using a camera of the mobile device. The user of the user device 102 can use the client software to upload the video to the platform 104, for example, to make the video content available for distribution to other users of the platform 104.

The platform 104 processes videos received from the user device 102 or otherwise obtained. The video processing can include various operations in addition to those described in this specification. For example, the video can be encoded with a particular encoding depending on the format of the received video. The content of the video can be analyzed, for example, to categorize the video or flag the video content as prohibited. For clarity, FIG. 1 is focused on a video processing system 105 of the platform 100 that transcodes and stores video content for delivery to user devices 106.

The video can be transcoded by a transcoding module 108. Video transcoding is a digital to digital conversion of one video encoding to another. In video streaming, transcoding allows for videos having different characteristics to be provided to user devices. For example, in low bandwidth network conditions, a lower resolution or lower bitrate version of the video can be provided to reduce potential stalling or buffering of the video while at higher bandwidth network conditions, higher resolution or bitrate versions can be provided. To provide these different versions of the video, the received video is transcoded by the transcoding module 108 into a number of different versions. The collected set of versions of the video are referred to as video ladders.

Transcoding can include processing the original input video to an intermediate uncompressed format and then encoding that version of the video into multiple encoding formats. A video can be transcoded into a set of versions, each version having particular resolution and bitrate characteristics. For example, an input video can be transcoded into the following video ladders:

4k, 16 Mbps
2k, 8 Mbps
1080p, 4.8 Mbps
1080p, 2.4 Mbps
480p, 900 Kbps
360p, 900 Kbps Thus, a given resolution, e.g., as shown with 1080p, can include versions with different bitrates. Similarly, the same bitrates can be used for versions of different resolutions as illustrated by the 480p and 360p versions each having a 900 Kbps bitrate.

Many conventional systems use static ladders meaning that each video is transcoded into the same ladder versions, the present specification, as described in greater detail below, provides techniques for customizing the ladder versions for each video, and for a group of user devices, based on characteristics of the individual video and different network conditions.

Once the video has been transcoded into multiple versions, the versions are stored as video ladders 112 in video storage 110. The video storage 110 may be a distributed storage among multiple storage devices. Further, the video storage 100 may be replicated in multiple locations such that multiple copies of the versions are stored, e.g., in multiple datacenters.

For new videos uploaded to the platform, the video storage 110 may make the ladder versions readily available for serving to user devices. A content delivery module 114, in response to an interaction with different end user devices 106, selects videos to provide to each user device 106 as well as the appropriate version from the corresponding video ladder 112. The selected version is then provided to the user device 106 for playback.

In some implementations, video processing system 105 may include other video processing, for example, compression of video data or re-encoding of input videos into a particular format.

FIG. 2 is a flowchart of an example process 200 for optimizing a video ladder for a given video. For convenience, the process 200 will be described as being performed by a system of one or more computers, located in one or more locations, and programmed appropriately in accordance with this specification. For example, a video processing system, e.g., the video processing system 105 of FIG. 1, appropriately programmed, can perform the process 200.

The system receives a video (202). The video can be received, for example, from a user device associated with a user account of the social media platform. For example, the user can generate the video content and upload it to the platform using the client software executing on the user device.

The system determines one or more user groups for generating video ladders (204). In particular, the system can determine optimized video ladders for each user group, each of which may share some relevant characteristics. In some implementations, the groups are based on geographic location and may be as large as countries or regions or narrower regions or cities. Users may be grouped based on other characteristics such as parameters associated with their user devices. For example, different operating systems may have different video playback capabilities and are therefore grouped separately. In some instances, groups are based on characteristics of the user that provided the video. For example, the user may have uploaded prior video content. By examining the user's historical network playback distribution for prior videos, different groups of potential viewer groups can be determined. Finally, in some implementations, the user groups are individual users of the platform meaning that the ladders are specific to each user's characteristics.

For each group, the system determines a set of optimized ladders for the video. For clarity, the process is described with respect to the steps in deriving an optimized utility formulation, however, once derived, not all steps need be performed for each video, i.e., only the variables in the final optimization formulation need be solved.

The system determines a network speed distribution for the group (206). For example, if the group is based on a country level, the network speed distribution is determined for the country. The network speed distribution can be determined based on historical playback of videos on user devices of users in the group. In particular, the communication between the client software of the user device and the platform can include network speed information.

Figure 3:
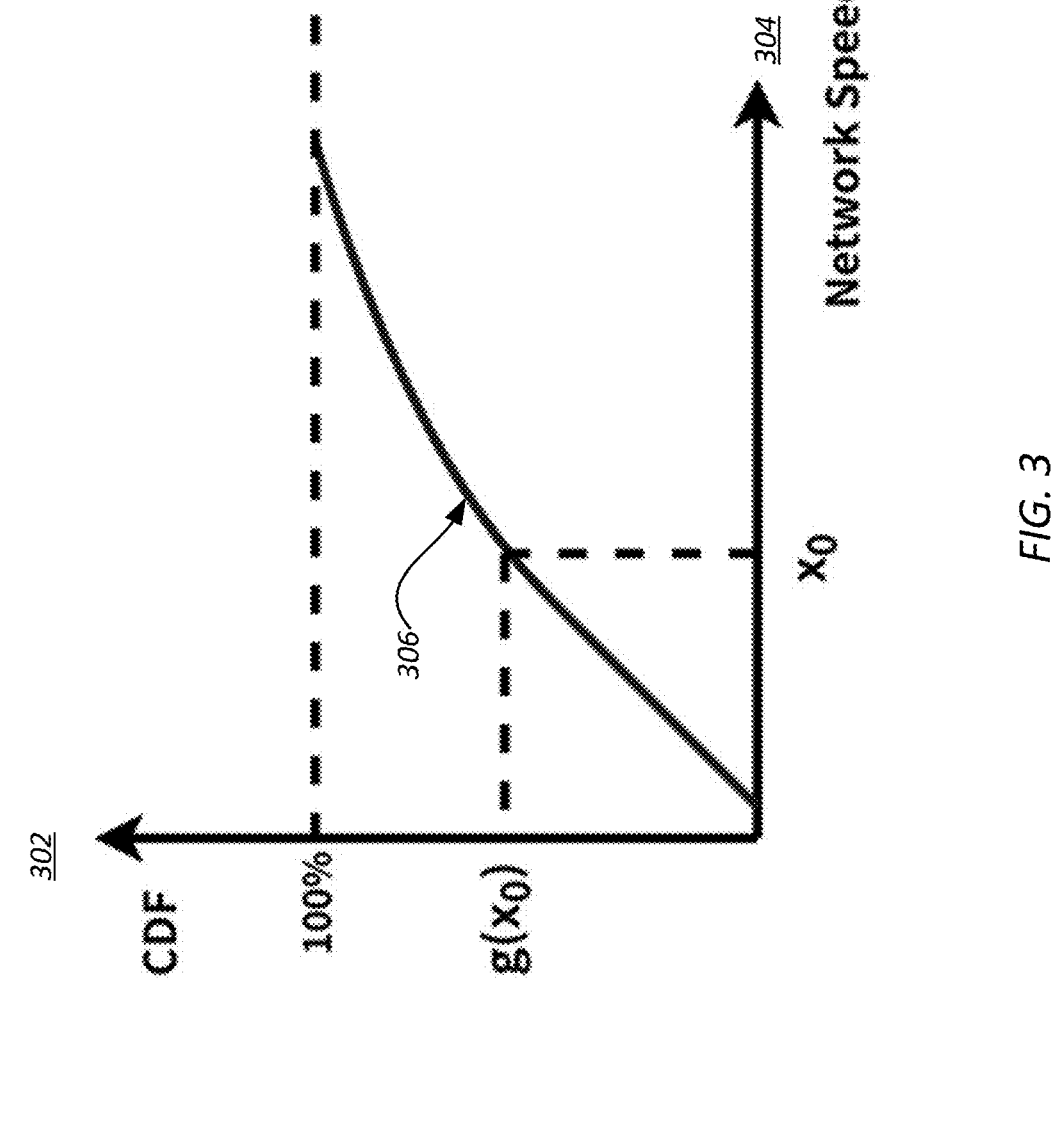
FIG. 3 is a chart of an example network speed distribution.

FIG. 3 is a chart 300 of an example network speed distribution. As shown in FIG. 3, the network speed distribution, $g_{(x)}$, is represented by a cumulative distribution function. The y-axis 302 represents the cumulative distribution function as a percentage value while the x-axis 304 represents the network speed, e.g., network bitrate. Each point $(x_0, g_{(x_0)})$ on the curve 306 means there are $g_{(x_0)}$ percentage of user views of video content whose network speed is less than $x_0$. Thus, for a very high network speed, the curve approaches 100% of user views of the video whose network speed is less than that. Similarly, that means at some point on the curve, there is a network speed at which half of the viewers of the videos are above the network speed and half of the viewers of the videos are below the network speed.

The system obtains a utility function (208) for the video. The utility function $f_{(x)}$ maps the network bitrate into the utility of the users in the group by watching the video. Qualitatively, utility is a measure of user experience in watching the video at that bitrate $x_i$. Mathematically, the utility is based on a measure of video quality, a rebuffering value, and a first frame delay value. These factors can be expressed as:

$$f(x) = vmaf_{(x)} - \alpha \cdot \text{rebuffering} - \beta \cdot \text{first frame delay} \qquad \text{(Equation 1)}$$

In Equation 1, $f(x)$ is the utility function at bitrate x, $vmaf_{(x)}$ is a video quality metric known as "video multimethod assessment fusion", and $\alpha$ and $\beta$ are weights. In particular, $vmaf_{(x)}$ is video quality metric for the video and represents how a particular user will perceive the video quality for a particular bitrate x. The value of $vmaf_{(x)}$ can be positive where the higher the value the greater the perceived quality or better the viewer experience. The value of vmaf can be determined by providing the video as input to a particular machine learning model. In particular, the machine learning model can be used to generate a predicted vmaf score for a video based, for example, on visual information fidelity, a detail loss metric, and a mean co-located pixel difference. The vmaf score can be quantified as a value between 0 and 100 for each frame and representing a comparison with a reference frame, e.g., where a score of 100 for a given frame means an identical quality to the reference frame. The values for the individual frames can be combined, e.g., an arithmetic mean, to generate an overall score for the video.

Rebuffering refers to a stall the user experiences when watching the video, for example, a user has started watching a video but playback stalls because it is still downloading video data. First frame delay refers to a delay in initiating playback of the video, e.g., when you first start to play a video or when you scroll to a new video. Rebuffering and first frame delay are negative factors that impact the viewer's experience. The values for $\alpha$ and $\beta$ are used to balance out the wight of the rebuffering and first frame delay factors to the utility measure.

The utility function takes into account the complexity of the video. Each ladder value will provide a vmaf and bitrate pair. The specific bitrate of the ladder will further affect the rebuffering and the first frame delay values. Thus, if the video is complex, then a high bitrate may be needed to achieve a certain vmaf score. The rebuffering and first frame delay will also generally be higher for more complex videos than less complex videos.

For example, at a high bitrate connection, the utility may also be high because rebuffering and frame delay are low and vmaf may be high. However, at some bitrates, utility may be acceptable for some videos and not for others depending on the video complexity, which impacts the variables of the utility function.

Based on historical playback data, the typical values for a vmaf score, rebuffering, and first frame delay can be calculated to determine a utility for the video. The utility value therefore provides a quantifiably measure of the user's experience in watching the video.

The system determines a measure of an overall utility based on a set of ladders for the video (210). Since each ladder will have different utility characteristics, the overall utility can be represented as a weighted summation of the individual utilities, e.g., corresponding to respective ladder characteristics, according to the following equation:

$$Q(t_1, t_2, \ldots, t_n) = \qquad\qquad \text{(Equation 2)}$$
$$(g(t_2) - g(t_1)) \cdot f(t_1) + (g(t_3) - g(t_2)) \cdot f(t_2) +$$
$$\ldots (g(t_n) - g(t_{n-1})) \cdot f(t_{n-1}) + (1 - g(t_n)) \cdot f(t_n)$$

In Equation 2, $t_1$, $t_2$, . . . , to represent a set of video ladders where each ladder $t_1$ corresponds to a particular transcoding of the video. $Q(t_1', t_2, \ldots, t_n)$ is the overall utility function for that set of video ladders $t_i$. Additionally, $g(t_i)-g(t_{i-1})$ represents a percentage of users that choose the ladder with the characteristics of ladder $t_{i-1}$ and $f(t_{i-1})$ is the corresponding utility that this portion of users obtain. In particular, Equation 2 indicates that each portion of the utility is based on the share of users that watch a particular ladder and their corresponding utility. For example, the utility from watching ladder $t_1$ is multiplied by the portion of users that choose ladder $t_1$ versus a different ladder. For example, for 100% of users, in some implementations 20 percent will watch ladder $t_1$, 25 percent will watch ladder $t_2$, and so on. Thus, the term $g(t_2)-g(t_1)$ means the portion of users that watch ladder $t_1$ and their utility is $f(t_1)$. The overall objective is then to determine the values of $t_i$ that maximize utility $Q(t_1, t_2, \ldots, t_n)$.

The system determines ladder values using dynamic programming (212). In particular, the objective is to identify the particular ladder values that maximize the overall utility of the video, which means maximizing the overall user watching experience across the different ladders.

In some implementations, the utility defined by Equation 2 is transformed into another formula that is similar to a particular type of problem suitable for solving using dynamic programming. In one example, a variable replacement is performed on Equation 2. In particular, a new variable p is chosen to replace $t_i$. The variable $p_i$ and $t_i$ have some specific function mapping so that they can be changed from one to the other and back again. In this example, the relationship between $t_i$ and $p_i$ is $t_i = g^{-1}(p_i)$, where $g^{-1}(x)$ is the inverse function of $g(x)$, the network speed distribution described above. As a result, the overall utility $Q$ from Equation 2 can be rewritten as $Q'$ as follows:

$$Q'(p_1, p_2, \ldots, p_n) = \qquad\qquad \text{(Equation 3)}$$
$$(p_2 - p_1) \cdot f(g^{-1}(p_1)) + (p_3 - p_2) \cdot f(g^{-1}(p_2)) +$$
$$\ldots (p_n - p_{n-1}) \cdot f(g^{-1}(p_{n-1})) + (1 - p_n) \cdot f(g^{-1}(p_n))$$

Figure 4:
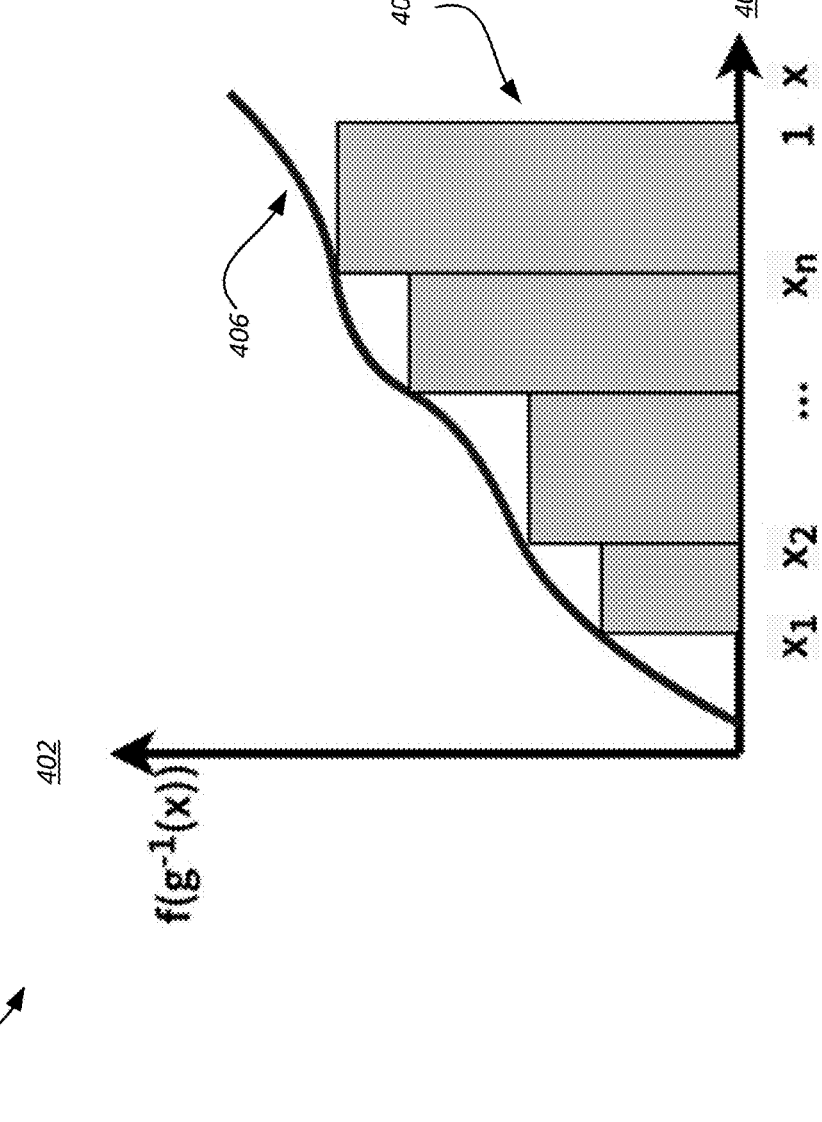
FIG. 4 is a chart of an example showing an example representation of the optimization goal.

This function resembles a problem illustrated by FIG. 4. FIG. 4 is a chart 400 showing an example representation of the optimization goal. In chart 400 the curve 402 is the function $f(g^{-1}(x))$. The y-axis corresponds to the function $f(g^{-1}(x))$ 402 and the x-axis corresponds to network speed 404. Recall that the network speed distribution g(x) represents a percentage of user views of video content whose network speed is less than x. The function $f(g^{-1}(x))$ maps the users (or group of users) percentile into the highest utility they can obtain from the given value of x. Thus, for a particular value of x, the area under the $f(g^{-1}(x))$ curve represents the proportion of users that can obtain at least a particular utility value.

The optimization goal is to select the corresponding points $x_1$, $x_2$, . . . , $x_n$ that maximize the area of the rectangles 408 under the curve 406. The selection of points forms distinct rectangles under the curve, each having a particular area. Then the final optimization will equal to select N points from the x-axis 404 that maximizes the area of the resulting rectangles. Each of these points $x_i$, will correspond to a $p_i$ in Equation 3.

Referring back to FIG. 2, to solve the optimization goal, the system uses dynamic programming to determine the values of $p_i$ that maximize $Q'(p_1, p_2, \ldots, p_n)$ (212). Dynamic programming is a technique to simplify a complex problem by breaking it up into smaller subproblems that are then solved. The solutions to the subproblems are then optimized to find an overall optimized solution to the overall problem. In some implementations, the subproblems can be further broken down into component sub-problems, and so on. Additionally, in some implementations, the subproblems are overlapping to some degree.

Similarly, when applying dynamic programming to the optimization goal, and with reference to FIG. 4 for illustration, the x-axis can be subdivided into a specified number of buckets, e.g., 1000. A state function S(X, N) can be used to represent the maximum area under the curve with N ladders in the first X buckets. The state update function for the recursion in the dynamic programing is:

$$S(i + K, j + 1) = \max(S(i + K, j + 1), S(i, j) + (f(g^{-1}(x_i)) \cdot K)) \quad \text{(Equation 4)}$$

The state update function builds the maximized set of buckets from the bottom up, meaning one block of area under the curve at a time. Each subsequent block is determined based on the previous blocks. Thus, each subsequent value of X is determine based on the prior values of X. The variable K represents a lookback window indicating how many prior states are used in determining the values of the current state.

In response to the dynamic programming solving for the optimal values of $x_i$, these values of $x_i$ are used as the $p_i$ values. The $p_i$ values can then be transformed into the ladder values $t_i$ that maximize Q based on the relationship $t_i = g^{-1}(p_i)$.

The system transcodes the video according to the determined optimal ladder values (214). For a given video the optimized ladders may be different from the ladder values of another video because different videos may have different optimized utility. For example, a more complex video may have a different optimized set of ladders than a less complex video for the same user group since complexity is incorporated into the utility function. For example, a less complex video, e.g., having less motion or fewer scene changes, may have ladders that use lower bitrates since this does not impact perceived quality of low complexity videos while more efficiently managing network resources.

As another example, a more complex video may require more ladder options than a less complex video. As a consequence, a less complex video may be able to maximize utility while storing fewer versions of the video, which reduces storage space used by the platform.

The system transcodes the video into multiple versions, each corresponding to one of the ladders. The system can then make the different transcoded versions of the video available for delivery to user devices, for example, in response to a request as described below with respect to FIG. 6.

Figure 5:
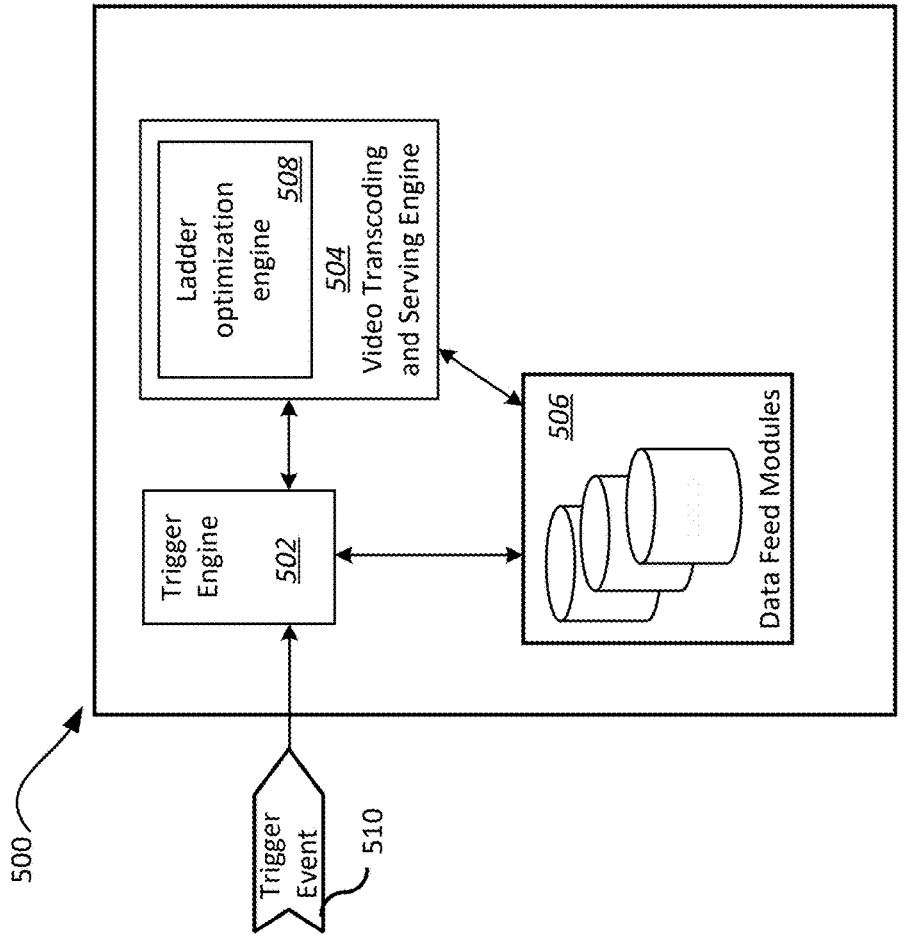
FIG. 5 is a block diagram of an example content delivery system.

FIG. 5 is a block diagram of an example content delivery system 500. The content delivery system 500 includes a trigger engine 502, a video transcoding and serving engine 504, and data feed modules 506. The video transcoding and serving engine 504 includes a ladder optimization engine 508.

The trigger engine 502 receives a trigger event 510. The trigger event 510 is an event that leads to the transcoding of a video. For example, the trigger event 510 can be the uploading of a video by a user device. The trigger engine 502 can obtain, for example, a video ID of a video that has been uploaded and is to be transcoded. The trigger engine 502 provides the video to the ladder optimization engine 508.

The ladder optimization engine 508 determines the particular ladders for the video based on the process described above with respect to FIG. 2. This can be an optimized form of a content adaptive encoding algorithm. The system outputs the set of ladders generated by the ladder optimization engine 508 to the video transcoding and serving engine 504. The video transcoding and serving engine 504 executes the transcoding of the video according to the set of ladders and makes the ladder versions available to end-user devices for playback.

The data feed modules 506 can include multiple different databases tasked with storing and updating various data used by the ladder optimization engine to determine ladders for a given input video. For example, they can contain and update data on network speed and video data for groups of user devices, e.g., video quality, rebuffering, and first frame delay information. These databases can be regularly updated, for example, once a week, once a day, once an hour, etc. For example, one data metric can be a percentage of users of the group that can view a 720p resolution video. This metric can change over time due to new devices, improved network speeds, user locations, etc. The data feed modules 506 can also collect playback data based on the ladder decisions, which may be used to provide feedback or adjustment of the optimization parameters. For example, the data feed modules can provide rebuffering statistics that indicate how often the users experiences a stall or rebuffering of video content, which may indicate that the selected ladder version had too high of a bitrate. The strategy for selected a particular ladder version may be updated based on the collected rebuffering statistics. In some implementations, this can be done periodically, e.g., once a day, once a week, etc.

Figure 6:
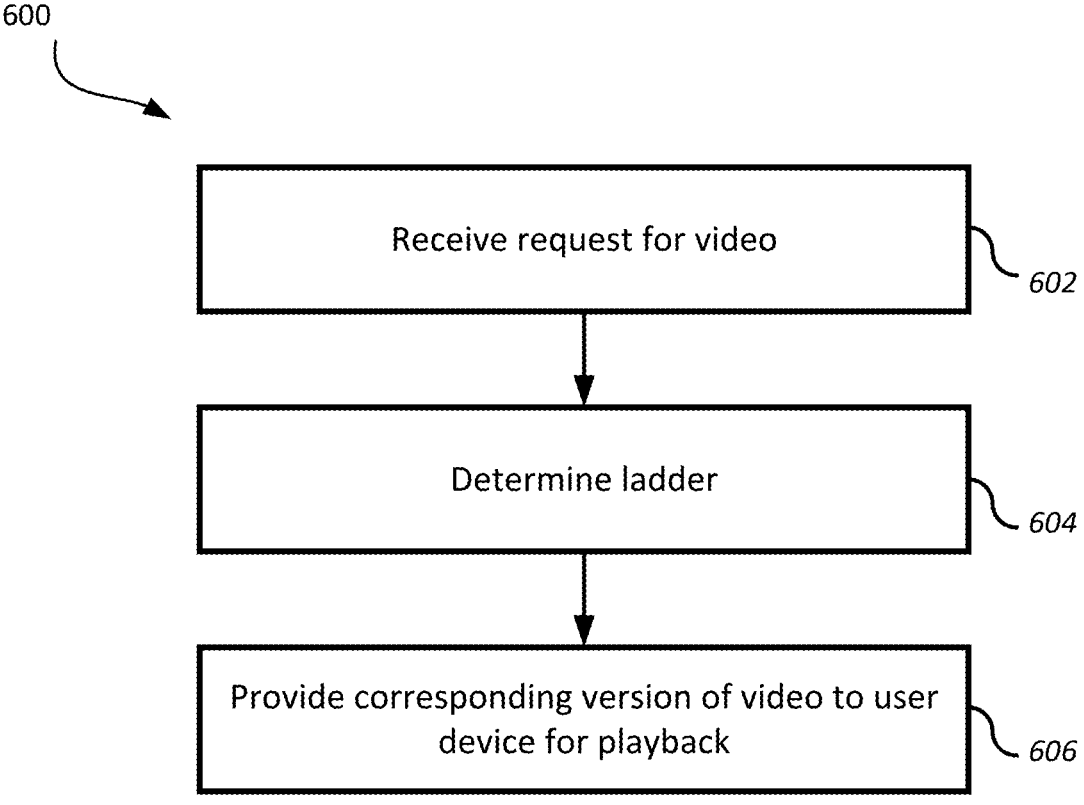
FIG. 6 is a flow diagram of an example process for providing a video to a user device.

FIG. 6 is a flow diagram of an example process 600 for providing a video to a user device. For convenience, the process 600 will be described as being performed by a system of one or more computers, located in one or more locations, and programmed appropriately in accordance with this specification. For example, a content delivery system, e.g., the content delivery system 500 of FIG. 5, appropriately programmed, can perform the process 600.

The system receives a request for a video from a user device (602). The request can be received, for example, in response to a user interaction with software installed on the user device. For example, the user can execute a software application installed on the mobile device that is associated with a social media platform that is configured to provide video content. Executing the software can cause the software to request the content delivery system of the platform to provide one or more videos as part of a video feed. In another example, a user scrolling through a video feed presented on a user interface of the software can cause the system to select additional video content and delivered to the user device by the content delivery system. While multiple videos may be requested and/or provided in a single interaction with the user device, for clarity the process 600 will focus on a single video. However, the system can perform a similar process for each video provided either individually or in batches.

It is important to note that the user device (or associated user) may not specify the video itself. Instead, the device can more generally request video content that is then specifically selected by the system. Thus, the request for the specific video may be determined by the system in response to a generalized request for content.

The system selects a ladder version of the video (604). The video may have one or more sets of ladders. For example, different sets of ladders may exist for different groups of users. In such scenarios, the system identifies which user group is associated with the request. The system then identifies a corresponding set of ladders for the video and, if applicable, the user group. The system then selects a particular ladder version from the set of ladders. The selection of a particular ladder version from the set of ladders can depend upon known information about the user device and/or associated user account. For example, the network capabilities between the platform and the user device can determine a suitable ladder version.

Additionally, user profile information indicating a preference of resolution over other factors such as stalling can influence the selection of the ladder version. For example, a user may explicitly indicate a preference of particular types of ladders, e.g., that emphasizes resolution or that minimizes lagging. However, the system may also infer the preferences from a user's historical behavior, for example, whether the user scrolls away from lower resolution videos at a higher rate than from higher resolution videos. In some implementations, the system selects the particular ladder version based on a combination of the ladder options, the network characteristics, and known or inferred user preferences.

The system provides the corresponding version of the video to the user device for playback (606). For a selected ladder version, there is a corresponding transcoded version of the video. The system retrieves the corresponding transcoded version of the video, e.g., from a suitable storage location, and provides that version to the user device. The software executing on the user device can then initiate playback of the video within a user interface of the user device.

In some implementations, the ladder version selected to provide to the user device for one video may be different for a next video not only because the set of ladders is specific to the video, but also because the network conditions may have changed between the platform and the user device.

Figure 7:
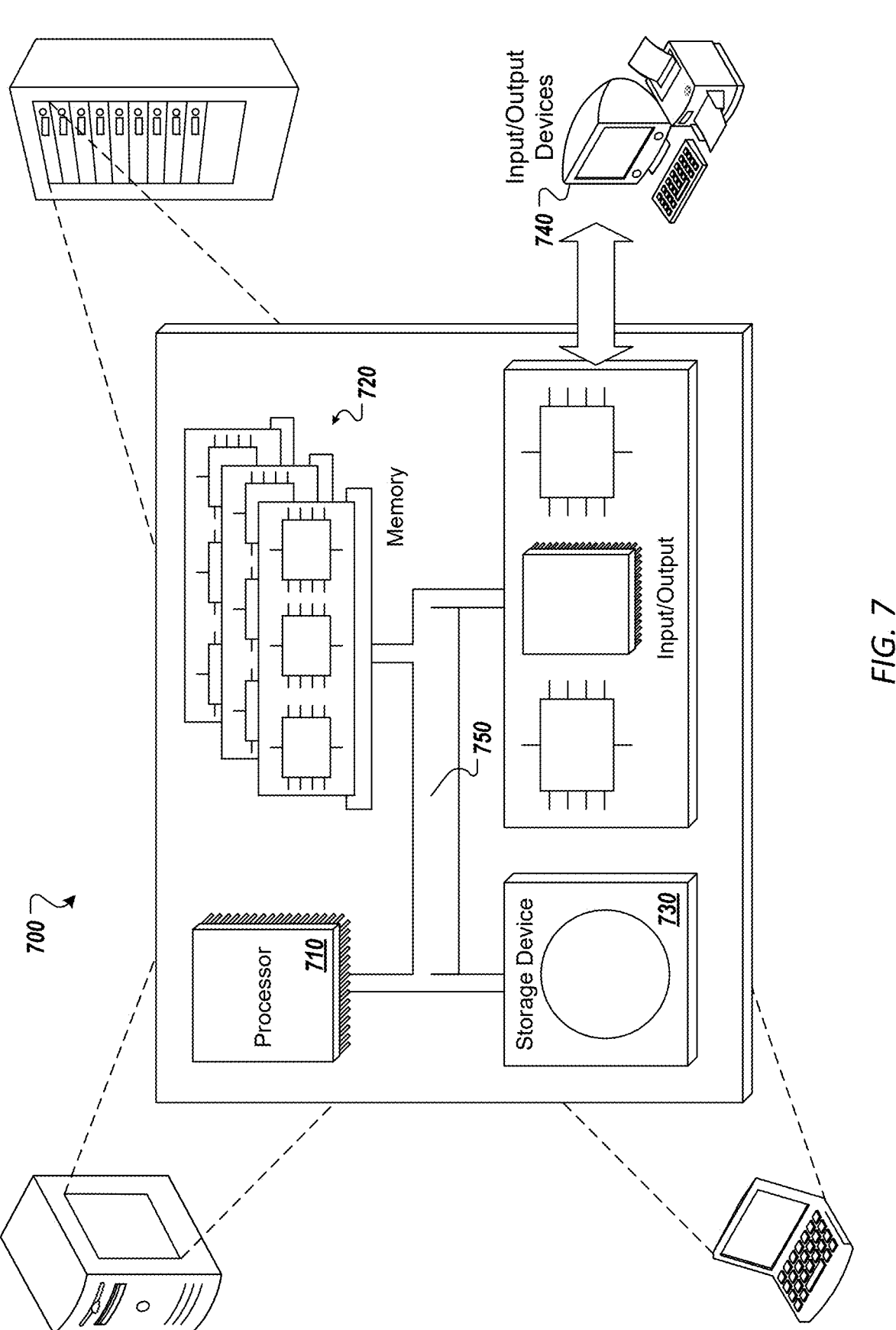
FIG. 7 is a block diagram of an example computing system.

FIG. 7 is a block diagram of a schematic diagram of an example computing system 700. The system 700 can be used for the operations described in association with the implementations described herein. For example, the system 700 may be included in any or all of the components of the content delivery system or video processing systems discussed in this specification. The system 700 includes a processor 710, a memory 720, a storage device 730, and an input/output device 740. The components 710, 720, 730, and 740 are interconnected using a system bus 750. The processor 710 is capable of processing instructions for execution within the system 700. In some implementations, the processor 710 is a single-threaded processor. The processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. The memory 720 can be a volatile memory unit or a non-volatile memory unit. The storage device 730 is capable of providing mass storage for the system 700. The storage device 730 is a computer-readable medium. The storage device 730 may be a floppy disk device, a hard disk device, an optical disk device, or a tape device. The input/output device 740 provides input/output operations for the system 700. The input/output device 740 includes a keyboard and/or pointing device. The input/output device 740 includes a display unit for displaying graphical user interfaces.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Embodiment 1 is a method, the method comprising: obtaining a collection of one or more video files at a content delivery system; for each video file in the collection of video files: determining a set of video ladders for the video file, each video ladder corresponding to a transcoding version of the video file having particular parameters, the set of video ladders determined based on a set of individual ladder values that substantially maximize a measure of utility for one or more users viewing a content the video, wherein the utility of the video is based at least in part on a complexity of the video content and historical network characteristics; for each ladder in the set of video ladders, transcoding the video file into a corresponding version; and storing each transcoded version of the video for delivery to user devices.

Embodiment 2 is the method of embodiment 1, wherein the determining the set of video ladders comprises applying dynamic programming configured to determine which video ladders maximize a measure of utility of the video, wherein the dynamic programming transforms an overall utility function for the video using one or more variable substitution formulas, the transformation including transforming the video ladder parameters to a function of an inverse network speed distribution.

Embodiment 3 is the method of any one of embodiments 1 through 2, wherein the dynamic programming breaks the transformed function into a plurality of overlapping sub-problems to solve in a recursive manner until an solution is obtained, wherein the transformed function is solved to determine a set of bitrate values that maximize an aspect of the transformed function, the set of bitrate values can then be transformed to corresponding ladder values based on the variable substitution formulas.

Embodiment 4 is the method of any one of embodiments 1 through 3, wherein each video file in the collection is a short-form video and wherein each short-form video has a content length of between 15 and 90 seconds.

Embodiment 5 is the method of any one of embodiments 1 through 4, wherein the utility of the video at a given bitrate is a function of i) video quality metrics, ii) rebuffering, and iii) first frame delay, wherein the video quality metric is a predicted measure of the perceived quality of the video content obtained through application of a machine learning model, and wherein the rebuffering and first frame delay are generated from historical playback data for a group of users.

Embodiment 6 is the method of any one of embodiments 1 through 5, wherein each video file is transcoded into one or more sets of video ladders, each set of video ladders corresponding to a different user group, and wherein the utility of the video for each user group is determined for a given bitrate based at least in part on the characteristics of the user group.

Embodiment 7 is the method of any one of embodiments 1 through 6, the method further comprising determining to provide a first video content from the collection of videos files to a particular user device; obtaining the set of video ladders for the first video; selecting a particular video ladder from the set of video ladders based at least on current network conditions between the user device an the content delivery system; and providing the transcoded version of the first video content corresponding to the particular video ladder to the user device.

Embodiment 8 is a system comprising: one or more computers and one or more storage devices storing instructions that are operable, when executed by the one or more computers, to cause the one or more computers to perform the method of any one of embodiments 1 to 7.

Embodiment 9 is a computer storage medium encoded with a computer program, the program comprising instructions that are operable, when executed by data processing apparatus, to cause the data processing apparatus to perform the method of any one of embodiments 1 to 7.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
obtaining a collection of one or more video files at a content delivery system; and
for each video file in the collection of video files:
determining a set of video ladders for the video file, each video ladder corresponding to a transcoding version of the video file having particular parameters, the set of video ladders determined based on a set of individual ladder values that substantially maximize a measure of utility for one or more users viewing video content of the video file, wherein the utility of the video content is based at least in part on a complexity of the video content and historical network characteristics, and comprising:
applying dynamic programming configured to determine which video ladders maximize a measure of utility of the video content, wherein the dynamic programming transforms an overall utility function for the video content using one or more variable substitution formulas, the transformation including transforming video ladder parameters to a function of an inverse network speed distribution;
for each ladder in the set of video ladders, transcoding the video file into a corresponding version; and
storing each transcoded version of the video file for delivery to user devices.

2. The method of claim 1, wherein the dynamic programming breaks the transformed function into a plurality of overlapping subproblems to solve in a recursive manner until a solution is obtained, wherein the transformed function is solved to determine a set of bitrate values that maximize an aspect of the transformed function, the set of bitrate values can then be transformed to corresponding ladder values based on the one or more variable substitution formulas.

3. The method of claim 1, wherein each video file in the collection is a short-form video and wherein each short-form video has a content length of between 15 and 90 seconds.

4. The method of claim 1, wherein the utility of the video content at a given bitrate is a function of i) video quality metrics, ii) rebuffering, and iii) first frame delay, wherein the video quality metrics is a predicted measure of perceived quality of the video content obtained through application of a machine learning model, and wherein the rebuffering and first frame delay are generated from historical playback data for a group of users.

5. The method of claim 1, wherein each video file is transcoded into one or more sets of video ladders, each set of video ladders corresponding to a different user group, and wherein the utility of the video content for each user group is determined for a given bitrate based at least in part on characteristics of the user group.

6. The method of claim 1, further comprising:
determining to provide first video content from the collection of video files to a particular user device;
obtaining the set of video ladders for a first video file;
selecting a particular video ladder from the set of video ladders based at least on current network conditions between the particular user device and the content delivery system; and
providing the transcoded version of the first video file corresponding to the particular video ladder to the particular user device.

7. A system comprising:
one or more computers and one or more storage devices on which are stored instructions that are operable, when executed by the one or more computers, to cause the one or more computers to perform operations comprising:
obtaining a collection of one or more video files at a content delivery system; and
for each video file in the collection of video files:
determining a set of video ladders for the video file, each video ladder corresponding to a transcoding version of the video file having particular parameters, the set of video ladders determined based on a set of individual ladder values that substantially maximize a measure of utility for one or more users viewing video content of the video file, wherein the utility of the video content is based at least in part on a complexity of the video content and historical network characteristics, and comprising:
applying dynamic programming configured to determine which video ladders maximize a measure of utility of the video content, wherein the dynamic programming transforms an overall utility function for the video content using one or more variable substitution formulas, the transformation including transforming video ladder parameters to a function of an inverse network speed distribution;
for each ladder in the set of video ladders, transcoding the video file into a corresponding version; and
storing each transcoded version of the video file for delivery to user devices.

8. The system of claim 7, wherein the dynamic programming breaks the transformed function into a plurality of overlapping subproblems to solve in a recursive manner until a solution is obtained, wherein the transformed function is solved to determine a set of bitrate values that maximize an aspect of the transformed function, the set of bitrate values can then be transformed to corresponding ladder values based on the one or more variable substitution formulas.

9. The system of claim 7, wherein each video file in the collection is a short-form video and wherein each short-form video has a content length of between 15 and 90 seconds.

10. The system of claim 7, wherein the utility of the video content at a given bitrate is a function of i) video quality metrics, ii) rebuffering, and iii) first frame delay, wherein the video quality metrics is a predicted measure of perceived quality of the video content obtained through application of a machine learning model, and wherein the rebuffering and first frame delay are generated from historical playback data for a group of users.

11. The system of claim 7, wherein each video file is transcoded into one or more sets of video ladders, each set of video ladders corresponding to a different user group, and wherein the utility of the video content for each user group is determined for a given bitrate based at least in part on characteristics of the user group.

12. The system of claim 7, wherein the instructions are further operable, when executed by the one or more computers, to cause the one or more computers to perform operations comprising:

determining to provide first video content from the collection of video files to a particular user device;

obtaining the set of video ladders for a first video file;

selecting a particular video ladder from the set of video ladders based at least on current network conditions between the particular user device and the content delivery system; and providing the transcoded version of the first video file corresponding to the particular video ladder to the particular user device.

13. One or more non-transitory, computer-readable storage media encoded with instructions that, when executed by one or more computers, cause the one or more computers to perform operations comprising:

obtaining a collection of one or more video files at a content delivery system; and for each video file in the collection of video files:

determining a set of video ladders for the video file, each video ladder corresponding to a transcoding version of the video file having particular parameters, the set of video ladders determined based on a set of individual ladder values that substantially maximize a measure of utility for one or more users viewing video content of the video file, wherein the utility of the video content is based at least in part on a complexity of the video content and historical network characteristics, and comprising:

applying dynamic programming configured to determine which video ladders maximize a measure of utility of the video content, wherein the dynamic programming transforms an overall utility function for the video content using one or more variable substitution formulas, the transformation including transforming video ladder parameters to a function of an inverse network speed distribution;

for each ladder in the set of video ladders, transcoding the video file into a corresponding version; and storing each transcoded version of the video file for delivery to user devices.

14. The computer-readable storage media of claim 13, wherein the dynamic programming breaks the transformed function into a plurality of overlapping subproblems to solve in a recursive manner until a solution is obtained, wherein the transformed function is solved to determine a set of bitrate values that maximize an aspect of the transformed function, the set of bitrate values can then be transformed to corresponding ladder values based on the one or more variable substitution formulas.

15. The computer-readable storage media of claim 13, wherein each video file in the collection is a short-form video and wherein each short-form video has a content length of between 15 and 90 seconds.

16. The computer-readable storage media of claim 13, wherein the utility of the video content at a given bitrate is a function of i) video quality metrics, ii) rebuffering, and iii) first frame delay, wherein the video quality metrics is a predicted measure of perceived quality of the video content obtained through application of a machine learning model, and wherein the rebuffering and first frame delay are generated from historical playback data for a group of users.

17. The computer-readable storage media of claim 13, wherein each video file is transcoded into one or more sets of video ladders, each set of video ladders corresponding to a different user group, and wherein the utility of the video content for each user group is determined for a given bitrate based at least in part on characteristics of the user group.

\* \* \* \* \*